United States Patent
Yoshizawa et al.

(10) Patent No.: US 7,716,301 B2
(45) Date of Patent: May 11, 2010

(54) ENVIRONMENT SETTING DEVICE, ENVIRONMENT SETTING PROGRAM STORAGE MEDIUM, INFORMATION PROCESSING DEVICE AND ENVIRONMENT SETTING METHOD

(75) Inventors: Hiroyuki Yoshizawa, Kawasaki (JP); Tadao Tsuchimura, Kawasaki (JP); Kaoru Ueno, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1039 days.

(21) Appl. No.: 10/355,282

(22) Filed: Jan. 31, 2003

(65) Prior Publication Data

US 2003/0212824 A1 Nov. 13, 2003

(30) Foreign Application Priority Data

Apr. 30, 2002 (JP) ............................. 2002-128070

(51) Int. Cl.
*G06F 15/16* (2006.01)
(52) U.S. Cl. .................. 709/217; 709/245; 713/100
(58) Field of Classification Search ................ 709/245, 709/217; 713/100
See application file for complete search history.

(56) References Cited

U.S. PATENT DOCUMENTS

| | | | | |
|---|---|---|---|---|
| 5,991,828 A | * | 11/1999 | Horie et al. | 710/8 |
| 6,757,821 B1 | * | 6/2004 | Akiyama et al. | 713/100 |
| 6,961,762 B1 | * | 11/2005 | Yeap et al. | 709/221 |
| 7,042,866 B2 | * | 5/2006 | Famolari | 370/338 |

FOREIGN PATENT DOCUMENTS

| | | |
|---|---|---|
| JP | 06-119265 | 10/1992 |
| JP | 7-262117 | 10/1995 |
| JP | 8-194657 | 7/1996 |
| JP | 11-252662 | 9/1999 |
| JP | 2001-142814 | 5/2001 |
| JP | 2001-202249 | 7/2001 |
| JP | 2001-309445 | 11/2001 |
| JP | 2002-112343 | 4/2002 |
| JP | 2003-091467 | 3/2003 |
| WO | WO 01/74011 | 10/2001 |
| WO | WO01/74011 A1 | 10/2001 |

OTHER PUBLICATIONS

Japanese Patent Office Action, mailed Dec. 4, 2007 and issued in corresponding Japanese Patent Application No. 2002-128070.
Korean Office Action issued on Mar. 18, 2009 in corresponding Korean Patent Application 10-2008-0034205.
Japanese Office Action, mailed Nov. 18, 2008 and issued in corresponding Japanese Patent Application No. 2002-128070.

\* cited by examiner

*Primary Examiner*—Hassan Phillips
*Assistant Examiner*—Glenford Madamba

(57) ABSTRACT

A network environment to which an information processing device is connected is recognized and an operating environment of an OS running on the information processing device is changed to an operating environment according to the recognized network environment.

40 Claims, 17 Drawing Sheets

| Name | Dialup entry | Subnet address | Device-specific IP address | MAC/Bluetooth address |
|---|---|---|---|---|
| Home | | 192.168.0.128 | 192.168.0.1 | 00-00-0E-E4-22-E9 |
| Office desk | | 10.20.30.0 | 10.20.30.4 | 00-05-3B-A1-43-12 |
| Parents' home | | 192.168.0.128 | 192.168.0.1 | 00-00-0E-E4-0D-D4 |
| Narita airport | | 100.200.5.128 | 100.200.5.100 | 00-00-57-0C-FF-10 |
| Tokyo station | | | | 00-01-02-03-04-05 |
| On-the-road | TokyoO3@abc | | | |
| Branch office | | 192.168.0.128 | 192.168.0.1 | 00-00-0E-D2-58-A0 |

Fig. 6

| Name | Mail setting | Browser setting | OS network setting | Dialup setting |
|---|---|---|---|---|
| Home | Mail1.dat | Browse1.dat | OS1.dat | |
| Office desk | Mail2.dat | Browse2.dat | OS2.dat | |
| Parents' home | Mail3.dat | Browse3.dat | OS3.dat | |
| Narita airport | Mail4.dat | Browse4.dat | OS4.dat | |
| Tokyo station | Mail5.dat | Browse5.dat | OS5.dat | |
| On-the-road | Mail6.dat | Browse6.dat | OS6.dat | Dial6.dat |
| Branch office | Mail7.dat | Browse7.dat | OS7.dat | |

Fig. 8

| Name | Operation of application | Application path |
|---|---|---|
| Home | Activate | C:\Program files\mail\mail.exe |
| Home | Activate | C:\Program files\Browser\browser.exe |
| Home | Deactivate | C:\Program files\Messanger\ipmes.exe |
| Office desk | Activate | C:\Program files\Backup\AotoBack.exe |

Fig. 10

| Priority | Device |
|---|---|
| 1 | LAN |
| 2 | Bluetooth |
| 3 | Dial-Up |

Fig. 12

ENVIRONMENT SETTING DEVICE, ENVIRONMENT SETTING PROGRAM STORAGE MEDIUM, INFORMATION PROCESSING DEVICE AND ENVIRONMENT SETTING METHOD

BACKGROUND OF THE INVENTION

1. Field of the Invention

The present invention relates to an environment setting method and device for setting an operating environment of an operating system (hereinafter sometimes abbreviated to "OS") running on an information processing device, wherein the information processing device has the OS running therein as well as an application program running on the OS to perform processing including communication over a network. The present invention further relates to an environment setting program storage medium containing an environment setting program to be executed in the information processing device for implementing the functionality of the environment setting device in the information processing device, and to an information processing device including the functionality of the environment setting device.

2. Description of the Related Art

In recent years, environments have been provided for personal computers (hereinafter sometimes abbreviated to "PCs"), personal digital assistants, cellular phones and their peripherals, and even home electric appliances to operate as information processing devices that are connected to a network to provide information processing capabilities. Networks have become essential in business operations. As continuous connection environments using ADSLs and CATVs are becoming widespread and more and more households are using more than one devices and appliances with information processing capabilities, the number of households that create home networking environment is increasing. In addition, more and more facilities such as airports, railroad stations and hotels and other open-air facilities are creating networks called "HotSpots" and are making available them to the public.

Furthermore, when a user connects his or her portable information processing device such as a notebook personal computer (hereinafter sometimes abbreviated to "notebook PC") to a network, he or she is often required to change the operating environment of the OS of the information processing device according to his or her current location and circumstances because the operating environment of an OS or settings for an application program may vary depending on connection methods.

According to a prior-art approach, different sets of network settings for an OS or application program for different locations are provided beforehand and the user can determine and select an appropriate set of network settings based on his or her current location to change the operating environment of the OS running in the information processing device or settings for an application program.

Another prior-art approach is described in Japanese published unexamined application No. 2001-202249. The application discloses a technology that facilitates setting of an environment for an application on each of terminals connected to different networks that supports a network environment to which the terminal is connected. Specific steps of the environment setting process are as follows.

First, different sets of application setting information for different network environments are stored in an information storage medium (memory card) beforehand.

Then, a user attaches the information storage medium to his or her terminal. The terminal sequentially reads a number of sets of setting information stored on the information storage medium that support network environments and sets the setting information one after another to try and determine whether or not the terminal can be connected to servers or access services.

If the terminal can successfully access the network on such a try, the setting information used on that try is eventually set in the application software, then the process ends.

The above-described tasks for setting the operating environment of an OS and the like are considerably complicated and are not routinely performed by ordinary users of information processing devices such as notebook PCs. Therefore, it is hard for an ordinary user to change the environment of his or her device each time he or she carries it into a new place.

Even for a user who is familiar with setting change tasks and has a good command of environment change, it is burdensome to change settings each time required.

According to the above-described prior-art technology in which a user can select an appropriate set of setting information from among pre-provided sets of setting information for different networks to cause an information processing device to automatically change settings, the setting change tasks can be simplified.

However, as the number of network environments (places) in which an information processing device is used increases, it becomes difficult to select setting information appropriate to a network environment. A user may select wrong setting information and, as a result, cannot properly use the network or must make several selection tries before he or she can select appropriate setting information.

According to the technology disclosed in the Japanese published unexamined application described above, a user can use a network without selecting setting information appropriate to the network. The technology makes a plurality of terminals statically connected to different networks ready for using one of the networks, but is not intended to allow one device to be used in a plurality of network environments.

Furthermore, in some cases, even though setting information allowing a network to be successfully used is selected according to this technology, the setting information may not be necessarily most appropriate to the user.

For example, a large intranet may be created in a company by connecting smaller networks created for its divisions or factories. In such an intranet environment, an employee can access network resources of his or her division or factory from any of the other divisions or factories within the intranet regardless of the location of the division or factory. However, in most intranets, network resources that employees are permitted to use when they access an external network from the intranets are specified for each individual division or factory. One such a network resource may be a proxy server.

In the above-described technology, the trial process will end when one network is successfully accessed. If there are a plurality of sets of setting information that allow the network to be accessed successfully, the one that has the highest priority is selected in a trial process and those having lower priorities are never selected. Thus, if there are a plurality of sets of setting information that allow the network to be accessed successfully, the highest-priority one is always selected.

Therefore, the above-described technology cannot address the case described above. A selected set of setting information that allows a network to be accessed successfully is not always setting information that is appropriate under operational regulations. Therefore, eventually, the user has to change manually the information set in the application software.

SUMMARY OF THE INVENTION

In view of the above circumstances, an object of the present invention is to provide a technology that automatically changes network connection environment settings on an information processing device to the most appropriate ones according to the place it exists.

To achieve the object, the present invention causes an information processing device performing processing including communication over a network to function as an environment recognition section detecting a unique address in a network environment to which the information processing device is connected and recognizing the network environment; and an environment setting section setting operating environment information according to the network environment recognized by the environment recognition section on the information processing device.

According to the present invention, a network environment to which an information processing device is connected is recognized and the operating environment of the information processing device is set to one appropriate to the recognized network environment. The user of the information processing device is relieved of the burdensome task of manually setting an operating environment. Even if the user is unable or slow to manually set an operating environment because of his or her unfamiliarity with such a task, an operation environment appropriate to a network environment can be set in his or her information processing device in a manner transparent to the user.

The environment recognition section of the present invention preferably searches a table containing unique addresses on a network that are associated with operating environment information that can be set on the information processing device for a unique address that matches a unique address existing in the network environment to which the device is connected and identify the network environment.

The environment recognition section can use the table to determine whether the recognized network is a network for which an operating environment can be automatically set in the information processing device.

The information processing device may be one capable of communication over any of an plurality of available networks. The environment recognition section may be one capable of recognizing any network to which the information processing device is connected among the plurality of networks. The device may be connected to the plurality of networks at the same time. To address such a case, the environment recognition section uses a table containing search priorities for the plurality of networks to search for a network environment to which the information processing device is connected in order of the priority.

An operating system is running on the information processing device and the environment setting section may set an operation environment information for the operation system that is appropriate to the recognized network environment. Preferably, the environment setting section refers to a table containing OS operating environment information that is associated with network environments to obtain the operating environment information for the network environment recognized by the environment recognition section and set that operating environment information.

The environment setting section can use the table to quickly set the operating environment of the operating system.

Alternatively, an application program is running on the operating system on the information processing device and the environment setting section may set operating environment information for the application program that is appropriate to the recognized network environment. Preferably, the environment setting section refers to a table containing operating environment information about the application program that is associated with network environments to obtain operating environment information of the application program that is appropriate to the network environment recognized by the environment recognition section and set that operation environment information.

The environment setting section can use the table to quickly set the operating environment of the application program.

According to the present invention, preferably an application program is running on an operating system on the information processing device and the information processing device is caused to function as an application control section that changes the operational status of the application program according to the recognized network environment. The application control section may refer to an application control table containing information indicating an application program to be activated or deactivated in association with a network environment to activate or deactivate the application program associated with the network environment recognized by the environment recognition section.

The application control section activates an application program required by the user according to a network environment or deactivates an application program that is not required in the network environment. This eliminates the need for the user to manually activate or deactivate the application program, thereby improving the usability of the device.

Preferably, a MAC addresses are detected as the unique addresses on the network in the present invention.

According to the present invention, the information processing device may be one that performs processing including communication over a LAN and the environment recognition section may obtain a unique address on the LAN to which the information processing device is connected to recognize a network environment to which the information processing device is connected. The information processing device may perform processing including communication over a Bluetooth-protocol-compliant network and the environment recognition section may obtain a Bluetooth address, which is the identification number of a Bluetooth device to which the information processing device is connected, to recognize a network environment in which the information processing device is connected.

The functionality of the present invention may be implemented by an information processing device, program, and environment setting device of the information processing device, or may be implemented as an environment setting method of the information processing device.

BRIEF DESCRIPTION OF THE DRAWINGS

FIG. 6 shows an example of network environment table;

FIG. 8 shows an example of an OS environment setting table;

FIG. 10 shows an example of an application control table;

FIG. 12 shows an example of a search priority table;

DETAILED DESCRIPTION OF THE PREFERRED EMBODIMENTS

Embodiments of the present invention will be described below.

Figure 1:
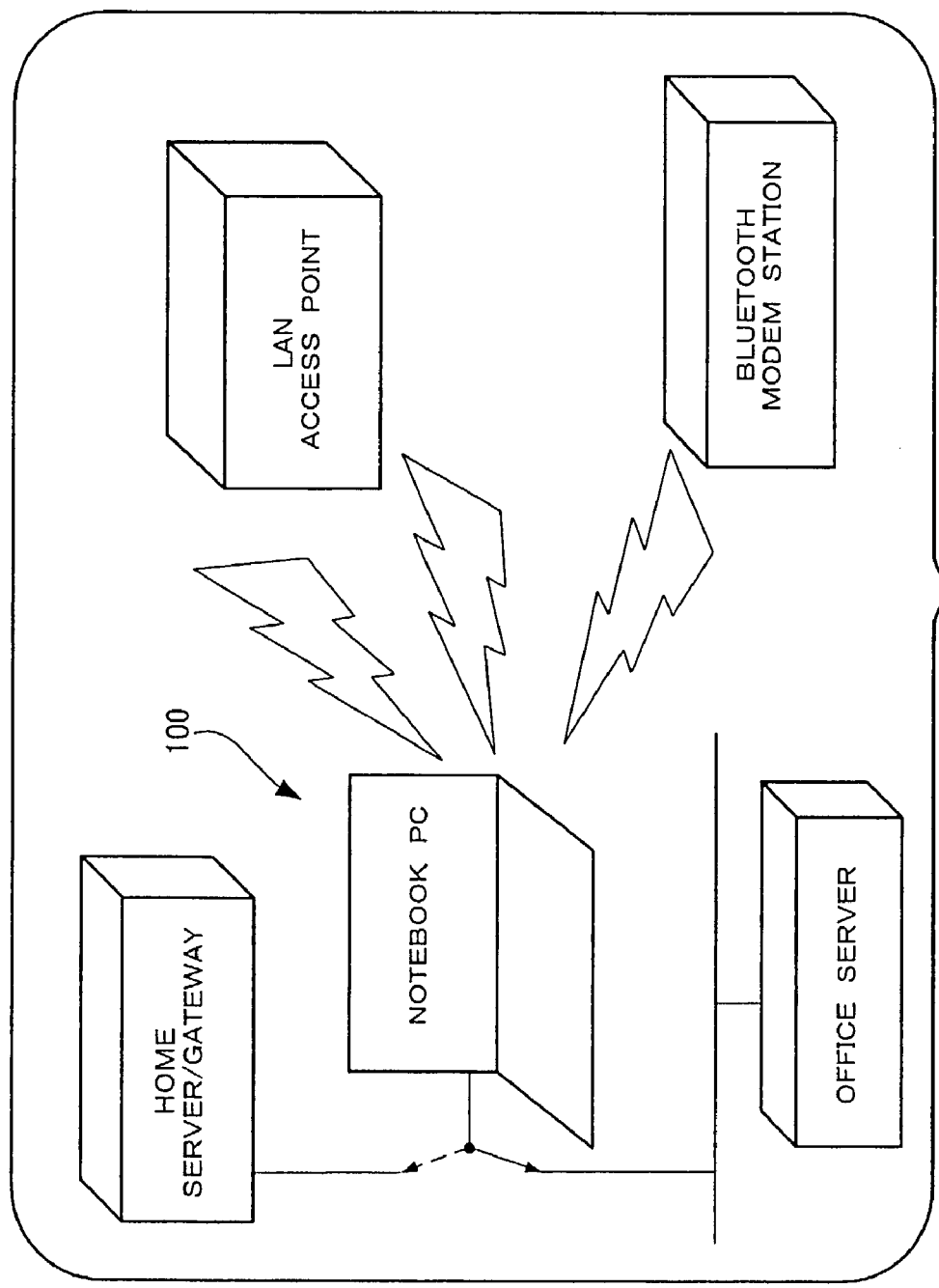
FIG. 1 shows an application of the present invention.

FIG. 1 shows an application of the present invention. An overview of the present invention will be described with reference to FIG. 1.

A notebook PC 100 is one example of an information processing device of the present invention. Within the notebook PC 100, an environment setting program, which is an embodiment of the present invention, is executed to implement an environment setting device, which is also an embodiment of the present invention.

The notebook PC 100 is carried with its user to various places, connected to various networks and used. In the example shown in FIG. 1, the notebook PC 100 is connected to a server/home gateway in the user's home, or to a server at his/her office, or wirelessly connected to a LAN access point in an environment in which the LAN can be used, or to a Bluetooth® modem station. Stored in the notebook PC 100 are information about plurality of such networks and information about OS environments required for using the networks. When the notebook PC 100 is connected to any of these networks, the environment setting program running on the notebook PC 100 recognizes the network environment to which the notebook PC 100 is connected and changes operating environment settings and the like of the OS of the notebook PC 100 to the ones suiting the recognized network environment.

A feature of one embodiment of the present invention is the environment setting capability implemented in the notebook PC 100. A hardware configuration of the notebook PC 100 will be described first and then the environment setting capability implemented in the notebook PC 100 will be described.

Figure 2:
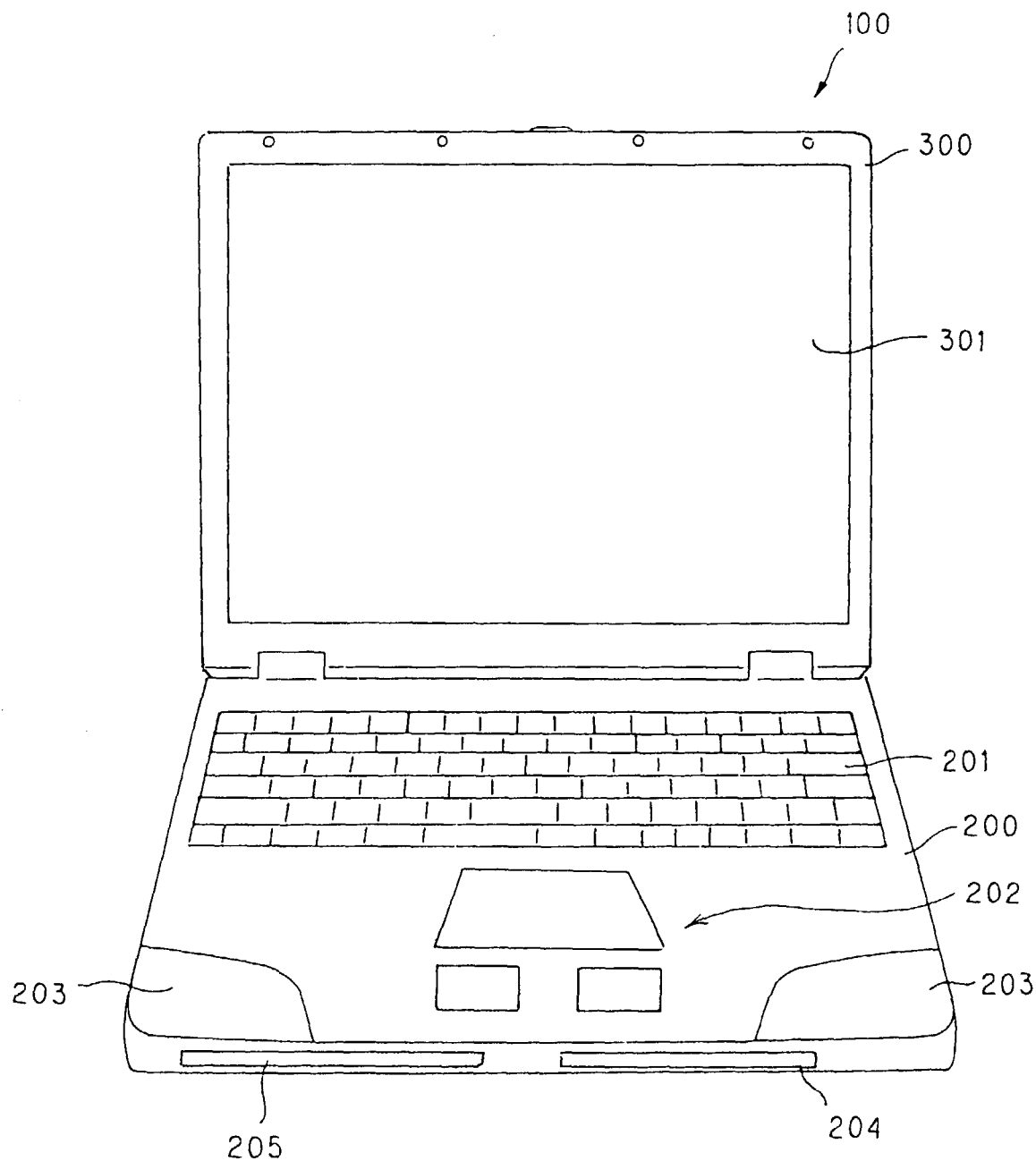
FIG. 2 shows an external view of a notebook PC, which is one embodiment of an information processing device according to the present invention.

FIG. 2 shows an external view of a notebook personal computer (notebook PC), which is an information processing device according to one embodiment of the present invention.

The notebook PC 100 includes a main unit 200 and a cover assembly 300 that can be flipped up or kept down over the main unit 200.

Provided on the part of the main unit 200 shown in FIG. 2 are a keyboard 201, a pointing device 202, a sound outlet 203 inside which a loudspeaker is provided, an FD slot 204 through which a flexible disk (FD) is inserted, and a CD-ROM slot 205 through which a CD-ROM is inserted, and so on. A liquid crystal display 301 is provided on the inner side of the cover assembly.

Figure 3:
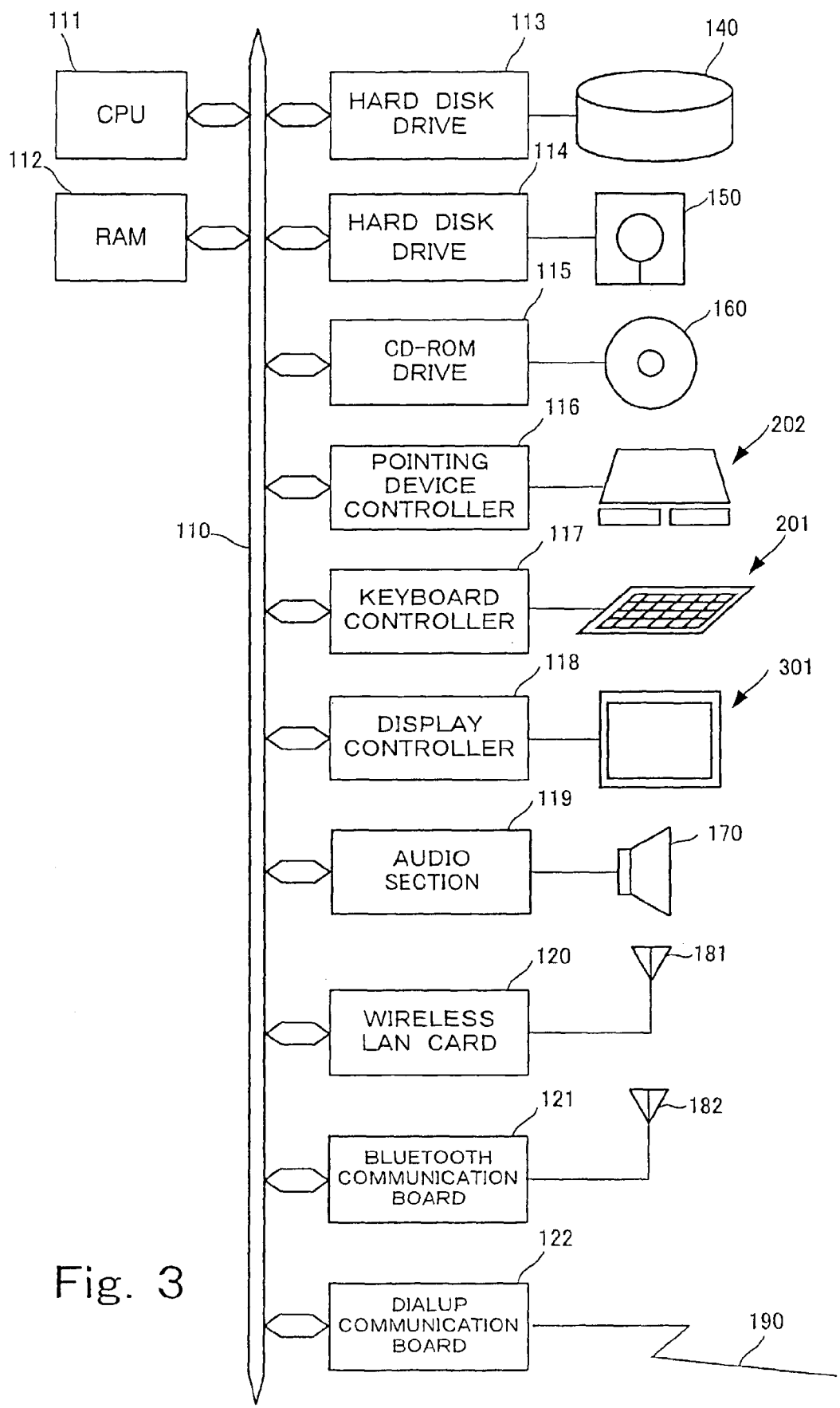
FIG. 3 shows an internal configuration of the notebook PC whose external view is shown in FIG. 2.

FIG. 3 shows an internal configuration of the notebook PC of which external view is shown in FIG. 2.

The notebook PC 100 in FIG. 3 includes a CPU 111 for executing various programs, a RAM 112 in which a program executed by the CPU 111 is loaded, a hard disk drive 113 for accessing a hard disk 140 contained in the notebook PC 100, an FD drive 114 for accessing an FD 150 loaded through the FD slot 204 shown in FIG. 2, a CD-ROM drive 115 for accessing a CD-ROM 160 loaded through the CD-ROM slot 205 shown in FIG. 2, a pointing device controller 116 for providing information about an operation of the pointing device 202 shown in FIG. 2 to the CPU 111, a keyboard controller 117 for providing information about an operation on the keyboard 201 to the CPU 111, a display controller 118 for controlling display panel on the liquid crystal display 301 according to directions from the CPU 111, an audio section 119 for causing sound to be outputted from a speaker 170 provided in the sound outlet 203 shown in FIG. 2 according to directions from the CPU 111, a wireless LAN card 120 for providing wireless LAN communication through an antenna 181, a Bluetooth communication board 121 for providing communication conforming to the Bluetooth® specifications through the antenna 182, and a dialup communication board 122 for providing dialup communication over a communication line 190. These components are interconnected over a bus 110.

According to the embodiment, a CD-ROM 160 is loaded through the CD-ROM slot 205 (see FIG. 2) of the notebook PC 100 described above on which an environment setting program is stored, which is one embodiment of the present invention and will be described later. The CD-ROM drive 115 installs the environment setting program stored on the CD-ROM 160 into the notebook PC 100 so that an environment setting device, which is one embodiment of the present invention, is configured in the notebook PC 100 and operated.

While the present embodiment is described with respect to the notebook PC 100 by way of example, the type of the device is not limited to a notebook PC. It may be any devices, such as a portable device such as a PDA (Personal Digital Assistant), a mobile communication terminal such as a cellular phone, a special-purpose terminal such as a handy terminal, or an electric appliance having capabilities (such as data communication capability and the capability of performing processes defined by the program of the present invention) that are required for implementing the present invention.

The storage medium on which the program of the present invention is stored is not limited to a CD-ROM. The program may be installed into a device such as a notebook PC from another external storage medium such as a removable storage medium or another device. It may be pre-stored in a storage medium provided in the device.

Figure 4:
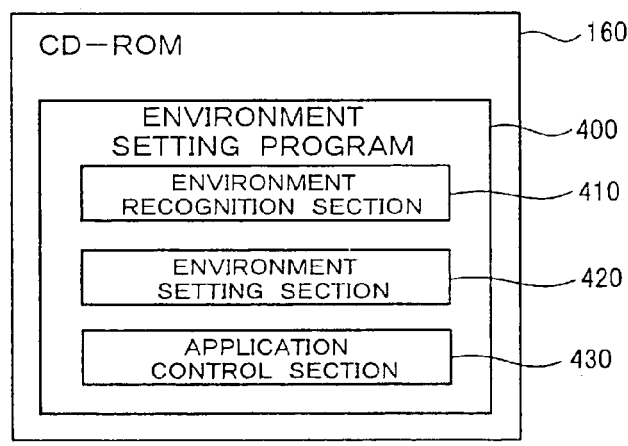
FIG. 4 shows a schematic configuration view of one embodiment of an environment setting program storage medium of the present invention on which an environment setting program is stored.

FIG. 4 schematically shows a configuration of one embodiment of the environment setting program storage medium of the present invention on which the environment setting program is stored.

The environment setting program 400 is stored on the CD-ROM 160 according to this embodiment and includes an environment recognition section 410, an environment setting section 420, and application control section 430. Effects of these components of the environment setting program 400 will described along with effects of components of an environment setting device 500 shown in FIG. 5.

Figure 5:
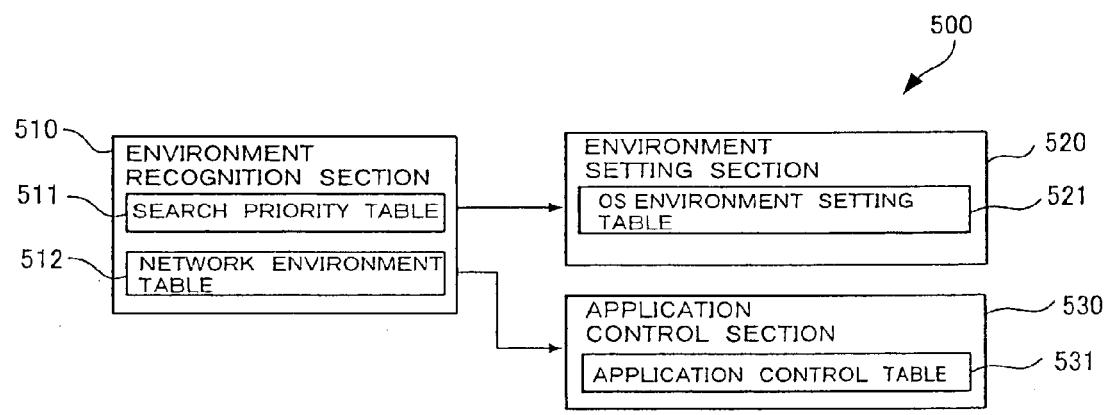
FIG. 5 shows a functional block diagram of an environment setting device according to one embodiment of the present invention.

FIG. 5 shows a functional block diagram of one embodiment of an environment setting device of the present invention.

The environment setting program 400 in FIG. 4 is installed and executed in the notebook PC 100 shown in FIGS. 2 and 3 whereby the environment setting device 500 is configured in it.

The environment setting device 500 in FIG. 5 comprises an environment recognition section 510, an environment setting section 520, and an application control section 530. The environment recognition section 510, environment setting section 520, and application control section 530 of the environment setting device 500 correspond to the environment recognition section 410, environment setting section 420, and application control section 430 of the environment setting program 400, respectively, shown in FIG. 4. These components 510 through 530 of the environment setting device 500 in FIG. 5 are implemented by a combination of hardware of the notebook PC 100 and software such as an OS running on the notebook PC 100 and an application program that is running on the notebook PC 100, whereas the components 410 through 430 of the environment setting program in FIG. 4 are implemented by the application program alone out of the hardware and software.

Effects of the components 510 through 530 of the environment setting device 500 in FIG. 5 will be described below, and the description of the components 410 through 430 of the environment setting program 400 in FIG. 4 will be omitted as they are covered by the description of the components 510 through 530.

The environment setting device 500 in FIG. 5 is contained in an information processing device (the notebook PC shown in FIGS. 1 through 3, in the example herein) in which an application program is running on an OS to perform processing including communication over a network for setting an operation environment for the OS running on the notebook PC.

The notebook PC 100 (see FIGS. 1 through 3) in which the environment setting device 500 is configured may be one capable of performing communication over any of a plurality of available networks, such as a Bluetooth-protocol-compliant network or a LAN, for example.

The environment recognition section 510 constituting the environment setting device 500 recognizes a network environment to which the notebook PC 100 (see FIGS. 1 through 3) is connected. When the notebook PC 100 is connected to a network conforming to the Bluetooth protocol, for example, the environment recognition section 510 obtains a Bluetooth address, which is an identification number of a Bluetooth device to which the notebook PC 100 is connected, and thereby recognizes the network environment. When the notebook PC 100 is connected to a LAN (Local Area Network), the environment recognition section 510 obtains a MAC address on the LAN to which the notebook PC 100 is connected to recognize the network environment in which the notebook PC 100 is connected.

In this process, MAC (Media Access Control) addresses and Bluetooth addresses are used as unique addresses on networks. Because these addresses are unique worldwide, a network environment to which the notebook PC 100 is connected can be uniquely identified. Besides MAC and Bluetooth addresses, any other addresses or information may be used that can uniquely identify networks.

Provided in the environment recognition section 510 is a search priority table 511 containing search priorities for a plurality of networks available through the notebook PC 100. During a process for recognizing a network environment to which the notebook PC 100 is connected, the environment recognition section 510 searches for a network according to the priorities contained in the search priority table to identify the network that has the highest priority among the available networks. This arrangement is provided in consideration of a case where the notebook PC 100 is connected to more than one network at a time.

Also provided in the environment recognition section 510 is a network environment table 512 containing addresses on networks associated with operating environments that can be set for an OS running on the notebook PC 100. The environment recognition section 510 obtains an address on a network to which the notebook PC 100 is connected to recognize a network environment and searches for an address that matches the obtained address among the addresses contained in the network environment table. This allows determination whether an OS operating environment that supports the recognized network environment can be set or not.

The environment setting section 520 of the environment setting device 500 shown in FIG. 5 sets the OS running on the notebook PC 100 to an operating environment appropriate to a network environment recognized by the environment recognition section 510. Provided in the environment setting section 520 is an OS environment setting table 521 containing operating environments of the OS running on the notebook PC 100 that are associated with network environments. The environment setting section 520 refers to the OS environment setting table to recognize an OS operating environment appropriate to a network environment recognized by the environment recognition section 510 and set operating environments the OS running on the notebook PC 100 to the recognized operating environment.

Provided in the application control section 530 constituting the environment setting device 500 is an application control table 531 containing information indicating application programs which are associated with network environments and are to be activated or deactivated. The application control section 530 refers to the application control table to activate or deactivate an application program that is indicated one that is to be activated or deactivated according to a network environment recognized by the environment recognition section 510.

The above-described embodiment will be further detailed below.

FIG. 6 shows one example of the network environment table 512 provided in the environment recognition section 510 in FIG. 5.

In the network environment table 512, "names" indicating the location of the notebook PC 100 (see FIGS. 1 through 3) are stored. "Dialup entries", "subnet addresses", "device-specific IP addresses", and "MAC/Bluetooth addresses" are associated and stored with the names as necessary. In this example, "Tokyo 03@abc" in the dialup entry column indicates a file in which a dialup telephone number etc. is stored.

As shown in the network environment table in FIG. 6, a unique address such as a MAC or Bluetooth address of the device on a network is associated with and stored with its network environment (location) such as "user's office desk" or "branch office" of the same company, thereby allowing the network environment to be recognized based on the unique address obtained from the network to which the device is connected, even if a subnet address or device-specific IP address is the same. Thus, unlike the technology disclosed in the Japanese published unexamined application described in the related art section in which certain setting information is always set, information best appropriate to a network environment to which an information processing device is connected can be set in that device.

Figure 7:
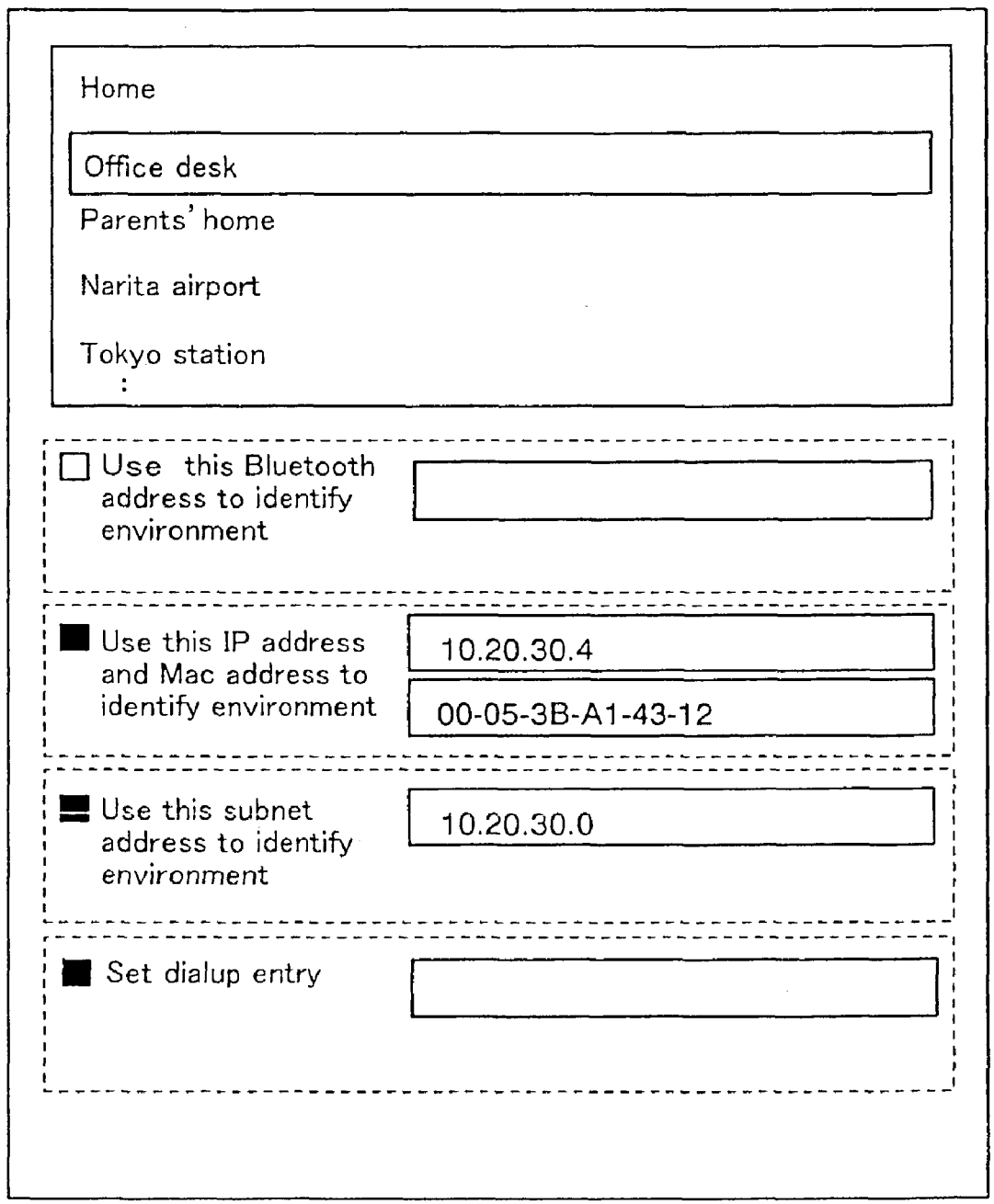
FIG. 7 shows an example of a network environment setting panel.

FIG. 7 shows an example of a display for setting network environments as illustrated in FIG. 6.

When a user specifies a "Set network environment" option on a menu panel, which is not shown, a network environment setting panel as shown in FIG. 7 is displayed. When the user types or selects a name indicating a location ("office desk" is selected in FIG. 7) and inputs a Bluetooth address, IP address, subnet address, and/or dialup address as required, the name is associated with the inputted addresses, thereby generating a network environment table as shown in FIG. 6.

FIG. 8 shows an example of the OS environment setting table.

In the "name" column in the OS environment setting table, the same names as those in the "name" column of the network environment table in FIG. 6 are stored. Columns of "Mail setting", "Browser setting", "OS network setting", and "Dialup setting" associated with the names are provided. These columns contains the names of files in which required data is stored as necessary. The OS environment table contains environment information about application programs such as mailers and browsers, in addition to environment information about the OS. For example, to set an OS environment for "office desk", mailer setting is performed according to data stored in a file, "Mail2.dat", browser setting is performed according to data stored in a file "browse2.dat", and network setting of an OS is performed according to data stored in a file "OS2.dat".

Figure 9:
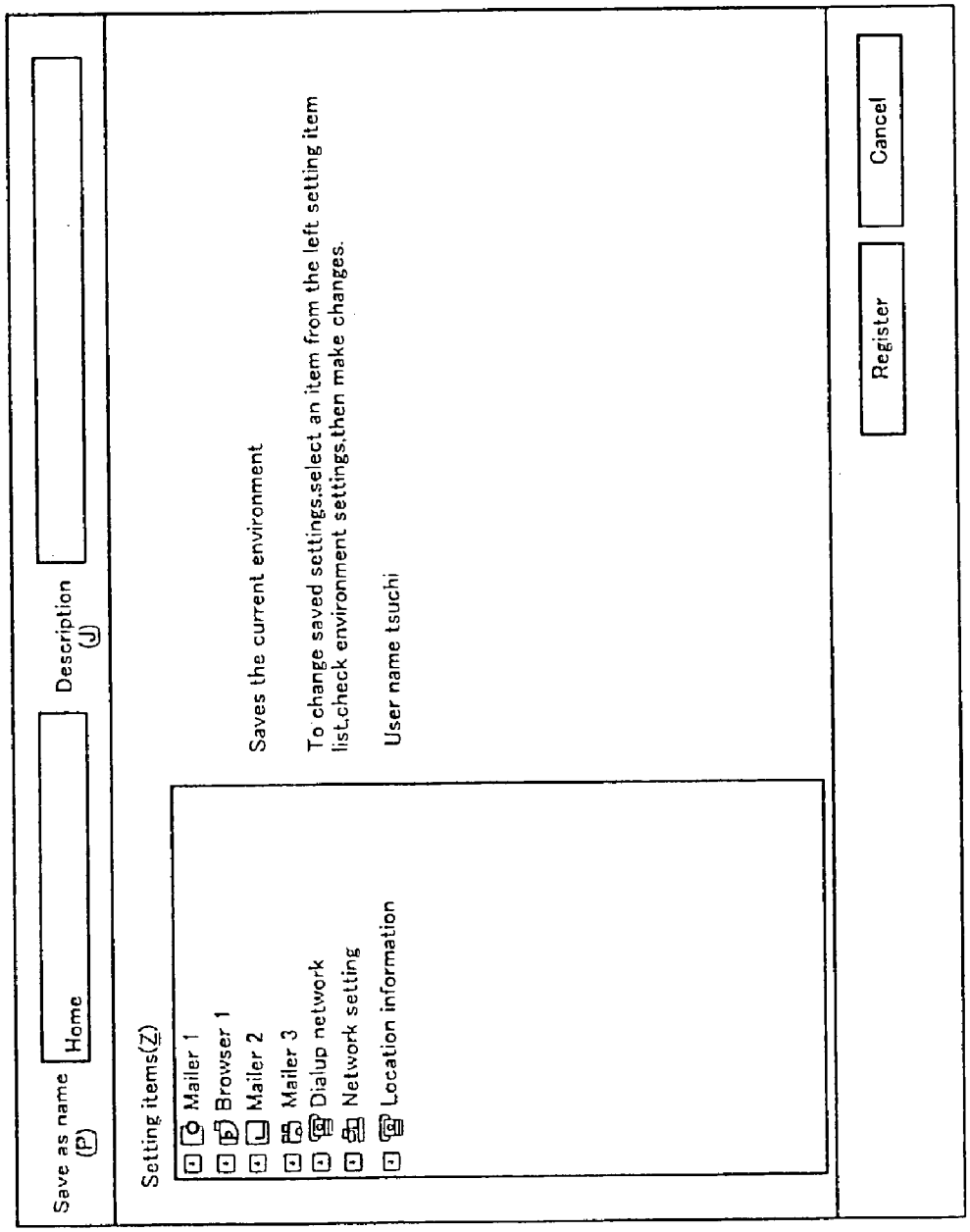
FIG. 9 shows an example of OS environment setting panel.

FIG. 9 shows an example of an OS environment setting panel.

As with the network environment setting panel shown in FIG. 7, the panel shown in FIG. 9 is displayed by specifying an appropriate entry on the menu panel, which is not shown.

In this example, the user selects an item from "setting items" to confirm or change the data concerning the item, fill in the "save as name" field with a "name" to be associated with a confirmed or changed environment, and clicks a "registration" button. As a result, a new OS environment setting entry is added to the OS environment setting table shown in FIG. 8.

FIG. 10 shows an example of an application control table.

In the application control table, an "operation of application" is associated and stored with a "name" given to a setting environment for indicating whether an application program is to be activated, or, deactivated if the application program is active, and an "application path" indicating the location of the application program to be activated or deactivated.

Figure 11:
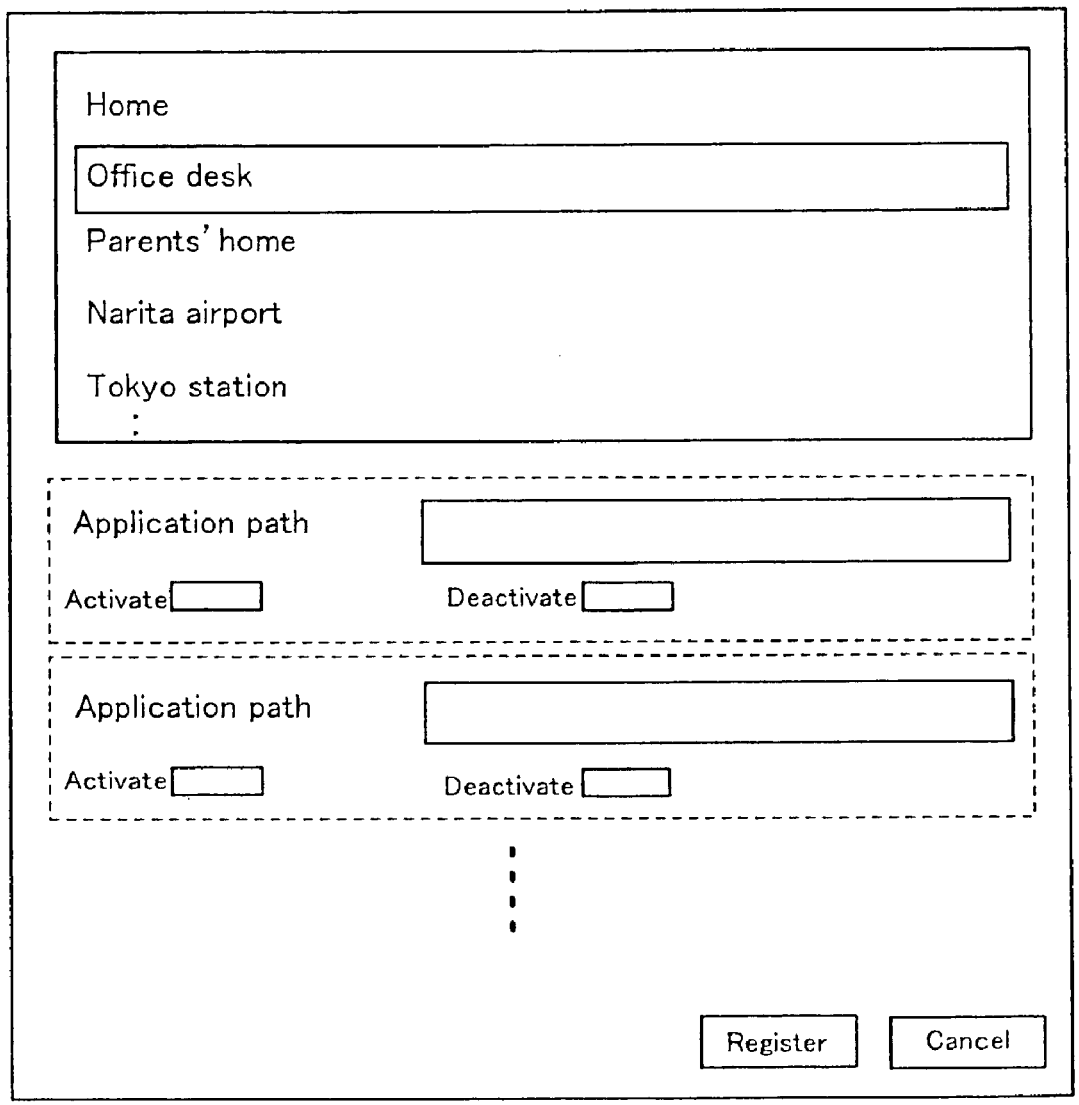
FIG. 11 shows an example of an application control table creating panel.

FIG. 11 shows an example of an application control table creating panel. Again, this panel is selected on the menu panel, which is not shown.

In this example, the user positions the cursor on a desired name on the "Name" list (The cursor is positioned on "Office desk" in the example in FIG. 11), fill in the "Application path" field, then specifies "Activate" or "Deactivate." When an application path is specified and "Activate" or "Deactivate" is specified, another specification box appears. When required boxes are filled in and the "Register" button is clicked, the entered application path and activation or deactivation is associated and stored with the "name" on which the cursor is positioned as shown in FIG. 10.

FIG. 12 shows an example of a search priority table.

In the table shown in FIG. 12, it is indicated that a network to which the notebook PC 100 is connected is searched for in the following order: LAN, Bluetooth, and Dialup.

Figure 13:
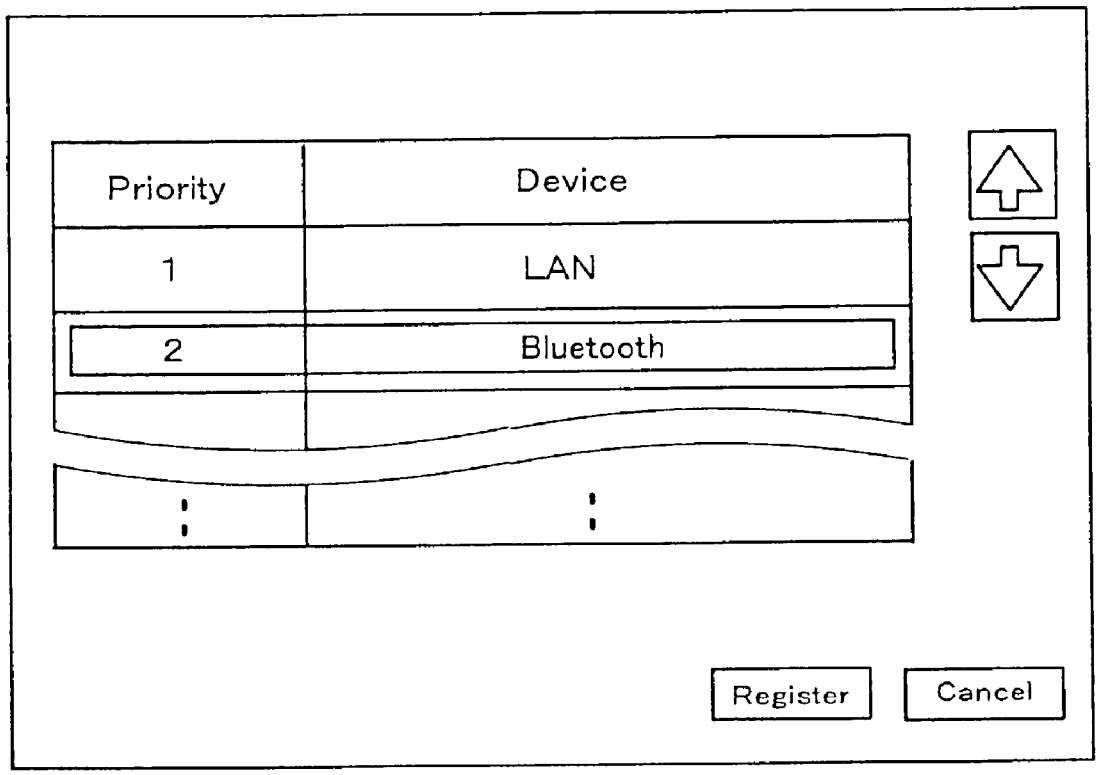
FIG. 13 shows an example of a search priority setting panel.

FIG. 13 shows an example of a search priority setting panel. Also this panel is selected on the menu panel, which is not shown.

On this panel, the user types the name of a communication device capable of communicating with this notebook PC 100 (see FIGS. 1 through 3) in a "Device" field associated with a "priority." When the up-arrow or down-arrow is clicked while the cursor is positioned on a device (the cursor is on "Bluetooth" having the second-highest priority in FIG. 13), the priority of the device at the cursor position is increased or decreased by one. When a priority is set in this way and the "Register" button is clicked, a search priority table as shown in FIG. 12 is registered.

Figure 14:
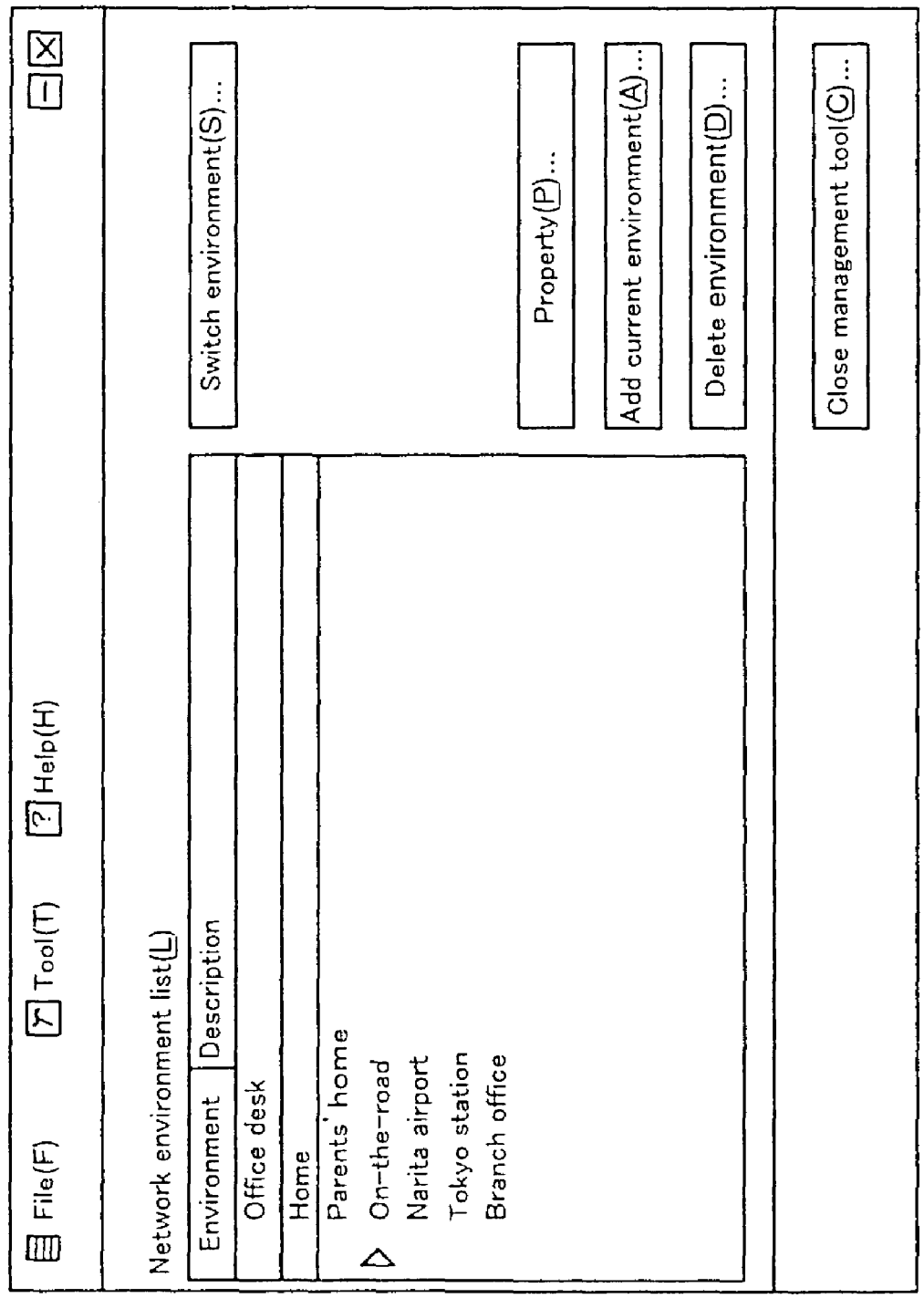
FIG. 14 shows an example of network environment manual switching panel.

FIG. 14 shows an example of a panel for manually changing an OS operating environment. Also this panel is selected on the menu panel, which is not shown.

In the embodiment herein, an OS operating environment can be set manually as well as automatically. When a network environment manual change button is clicked on a panel, which is not shown, the panel shown in FIG. 14 appears.

A triangular arrow in the network environment name (Name) display area in FIG. 14 is a cursor indicating a name assigned to the environment currently set on the notebook PC 100. In the example shown in FIG. 14, an environment named "On-the-road" is set on the notebook PC 100. The cursor of the pointing device 202 (see FIG. 2) is positioned in the "Home" field in FIG. 14. When a "Switch environment" button is clicked while cursor is positioned on a given environment name, the setting environment is changed to an environment indicated by the environment name ("Home" in the example shown in FIG. 14) on which the pointing device cursor is positioned.

If the user wants to save the currently set environment, he or she clicks an "Add current environment" button in FIG. 14. The "Add current environment" button is clicked to save a set environment after the various environment settings are made on various environment setting panels (such as a mailer setting panel, browser setting panel and the like), which are not shown. When the "Add current environment" button is clicked, an OS environment setting panel as shown in FIG. 9 appears. Then, the user checks the OS environment currently set on the OS environment setting panel, inputs a name (environment name) to be assigned to the OS environment, then clicks "Register" button. Through this procedure, a new OS environment can be set.

When a "Delete environment" button is clicked while the pointing device cursor is positioned on the name of an environment to be deleted in the panel in FIG. 14, the environment registered under that name is deleted. This deletion is reflected in all of the network environment table in FIG. 6, the OS environment setting table in FIG. 8, and the application control table in FIG. 10.

Figure 15:
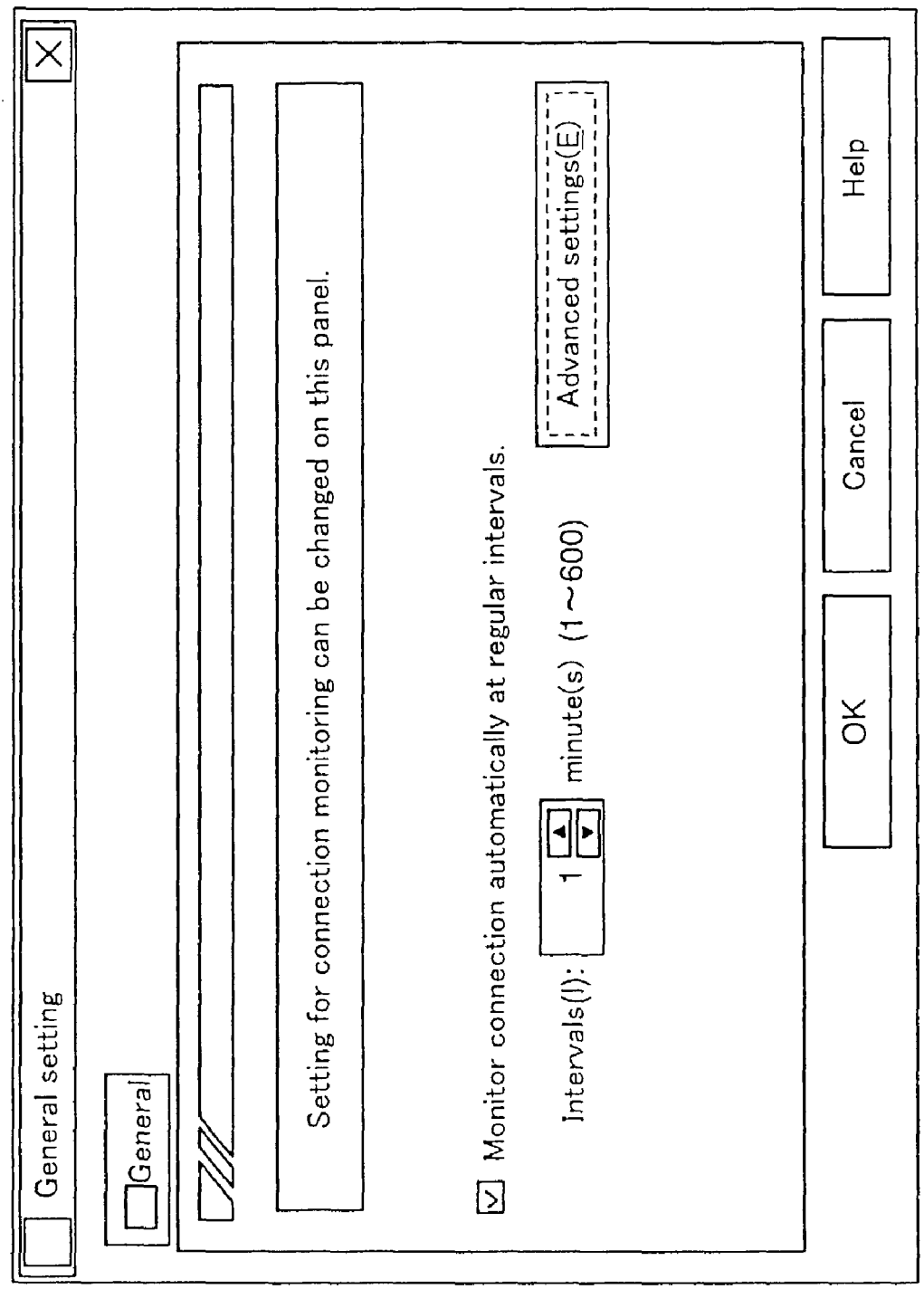
FIG. 15 shows an example of a watchdog timer setting panel.

FIG. 15 shows an example of a watch dog timer setting panel. This panel is selected on the menu panel, not shown.

Time intervals at which connection monitoring is automatically performed are set on this panel.

In the example shown in FIG. 15, time intervals are set to one minute and the "OK" button is clicked to confirm the setting. Use of the connection monitoring time intervals set on this panel will be described later.

FIGS. 16 through 20 show flowcharts of an environment setting program executed on a notebook PC.

When a user double-clicks an icon on a liquid crystal display or presses a function key or shortcut button on the keyboard, the environment setting program shown in FIGS. 16 through 20 is activated. Alternatively, the environment setting program can be registered so as to be automatically activated upon activation of an OS.

When this program is activated, the search priority table shown in FIG. 12 is checked first and search priority is recognized (step S1). Then, it is determined whether the notebook PC 100 is connected to any network (step S2). If it is connected to a network, the search priority table in FIG. 12 is searched for the network in order of priority specified in the table (steps S3 through S5). If the PC 100 is connected to a LAN (step S3), its subnet address is obtained from the LAN (step S6) and the IP address of a gateway is obtained. Based on the gateway IP address, the MAC address of the gateway device is obtained through ARP (step S7). If the user wants to identify a device beyond the subnet, he or she can manually input the IP address of the device to obtain the MAC address of the device. Typically, the IP address of a gateway of a home network is the IP address of a LAN router, therefore the IP address is not required to be input manually.

If the network is a LAN, devices on the network may be a router, server, or another client computer.

If the network is a cable network, a LAN cable is connected to the device. If the network is a wireless network, whether the information processing device is physically connected to the network is determined by an OS such as Windows® from Microsoft Corporation based on whether the device is within the coverage of an access point. Thus, the determination at step S2 can be made by using that capability of the OS.

To obtain a MAC address on the network, ARP (Address Resolution Protocol) can be used. ARP is a protocol in the TCP/IP protocol suit for obtaining an Ethernet address (MAC address) from an IP address. The Ethernet address and IP address of the device and the IP address of the other part of the communication are placed in a query packet and broadcasted onto the LAN. If a device on the LAN finds its IP address in the query packet, it places its MAC address in a response packet and sends it back.

That is, according to the present invention, a device-specific IP address in the network environment table in FIG. 6 is placed in a query packet as the address of the other part of the communication and the packet is broadcasted onto the network through ARP. If a response packet is received, a MAC address can be obtained.

Following the search priority specified in the search priority table, if it is determined that the notebook PC 100 is connected to a Bluetooth network (step S4), the Bluetooth address (represented by the MAC address in FIG. 16) of a Bluetooth device with which the PC 100 communicates is obtained (step S7). On the other hand, if the notebook PC is connected to a dialup network (step S5), a dialup entry name is obtained (step S8). In either case, the network environment table shown in FIG. 6 is searched (step S9).

If it is determined at step S2 that the notebook PC 100 is not connected to any network, then the surrounding of the notebook PC 100 is searched for a Bluetooth device. If a Bluetooth device is found (step S11), then the Bluetooth address of the device is obtained (step S7) and the network environment table in FIG. 6 is searched (step S9).

If the search through the network environment table in FIG. 6 at step S9 finds a MAC address (Bluetooth address) that matches the MAC address (Bluetooth address) obtained from the network (step S12 in FIG. 17), or if the search finds no matching MAC address but one and only matching subnet address in the network environment table (step S13), a file specified in the name column that matches the name of the network environment in the OS environment setting table in FIG. 8 is referred to in order to change the OS environment (step S14), and if the application control table in FIG. 10 contains a name that matches the name of the network environment, the application program of the application path specified in the row of that name is activated or deactivated according to the indication of "Activate" or "Deactivate" contained in that row (step S15). Then, the process proceeds to step S16.

Figure 18:
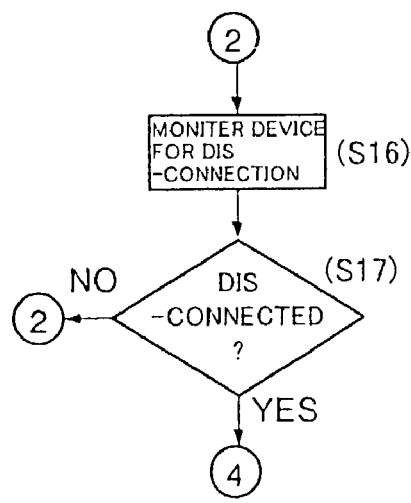
FIG. 18 shows a flowchart of the environment setting program running on the notebook PC.

At step 16 in FIG. 18, it is monitored whether the notebook PC 100 is disconnected from the network. If it is disconnected from the network (step S17), the process proceeds to step S20 shown in FIG. 20. The FIG. 20 will be described later.

Figure 17:
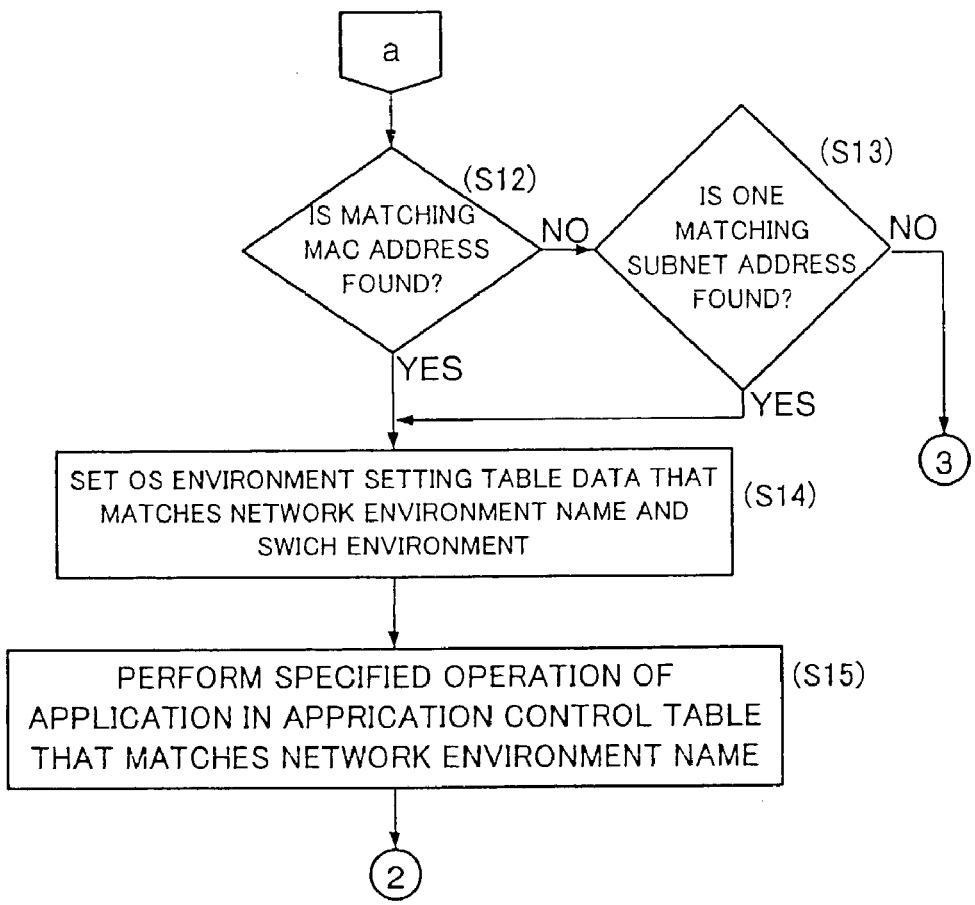
FIG. 17 shows a flowchart of the environment setting program running on the notebook PC.
Figure 19:
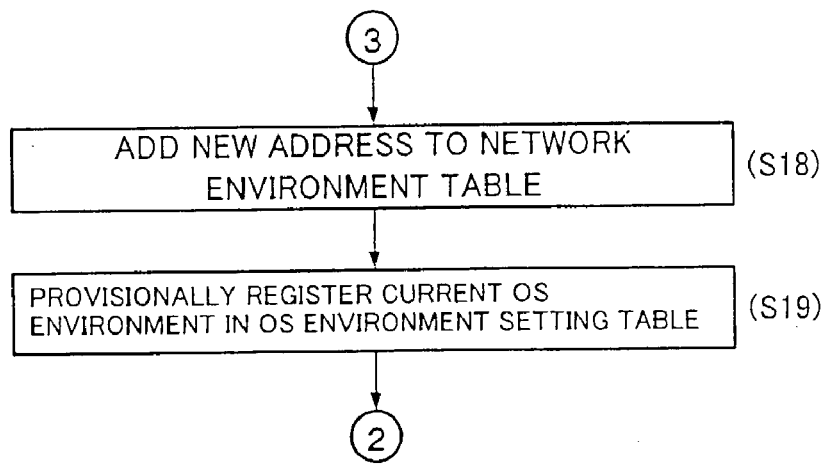
FIG. 19 shows a flowchart of the environment setting program running on the notebook PC.

If it is determined at steps S12 and S13 in FIG. 17 that the network environment table in FIG. 6 contains no matching MAC address nor does it contain one and only matching subnet address, the process proceeds to step S18 in FIG. 19. At step S18, the MAC address (including a Bluetooth address) or subnet address etc. obtained from the network through this process is added to the network environment table in FIG. 6 and a provisional name (such as "new place", for example) is given to the newly added entry. At step S19, the current OS environment is registered in the OS environment table in FIG. 8 under the same provisional name. The name and OS environment can be changed on the panel shown in FIG. 9.

Figure 16:
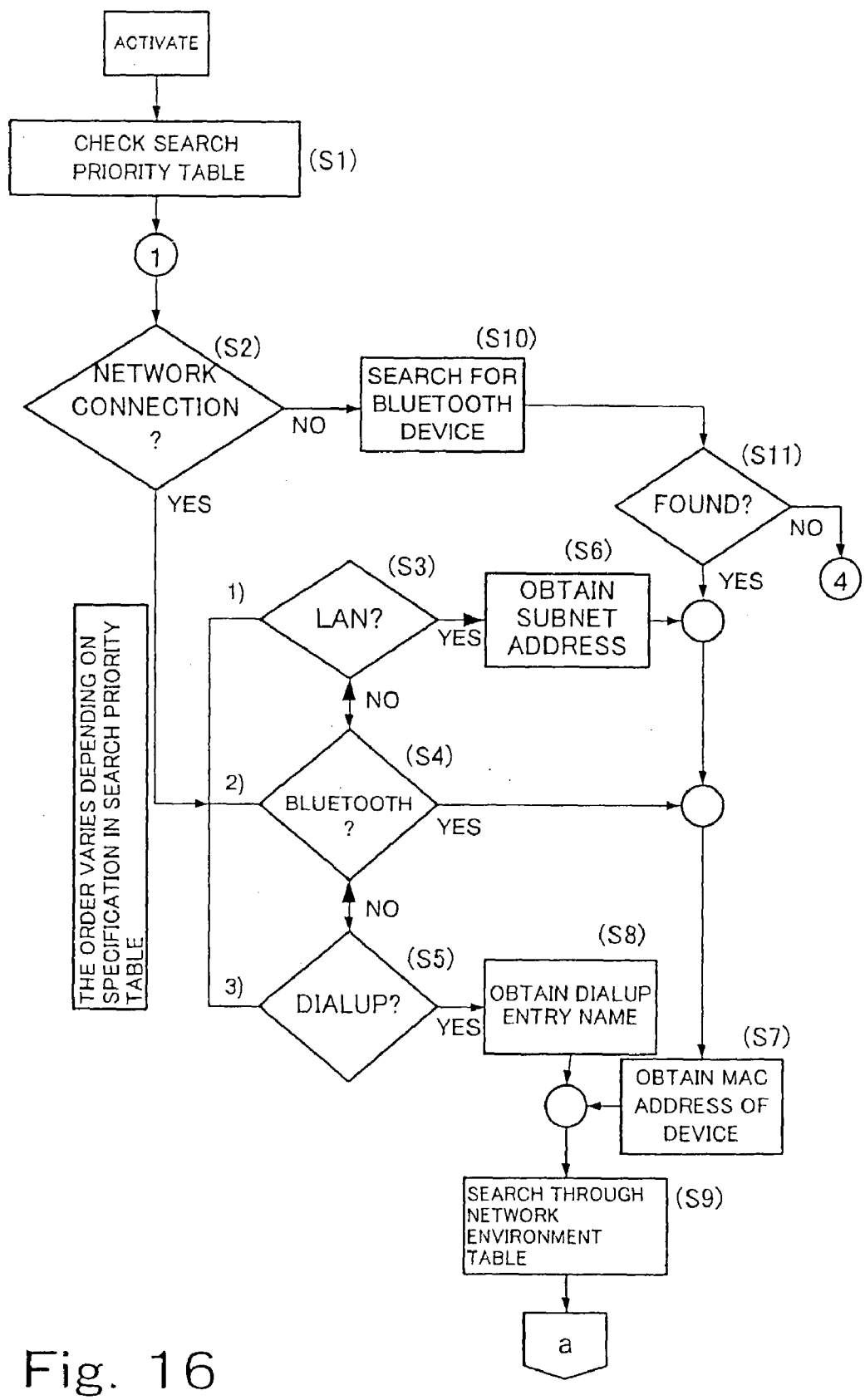
FIG. 16 shows a flowchart of an environment setting program running on a notebook PC.
Figure 20:
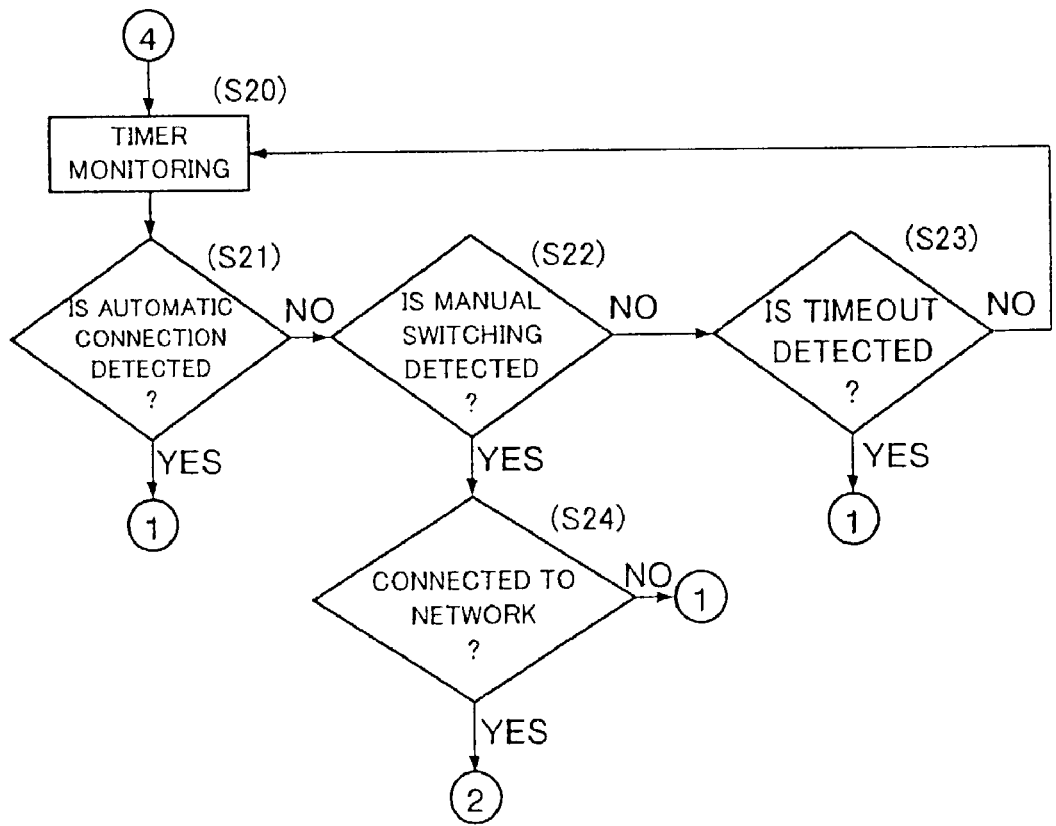
FIG. 20 shows a flowchart of the environment setting program running on the notebook PC.

The search for a Bluetooth device at step S10 in FIG. 16 finds not Bluetooth device (step S11), or disconnection is detected at step S17 in FIG. 18, then the process proceeds to step S20 in FIG. 20.

At step S20, a timer for measuring time intervals set on the panel in FIG. 15 is activated and monitored for its timeout. At steps S21, S22, and S23, whether automatic connection to a network is detected, whether manual environment switching is performed (see FIG. 4), and whether a timeout of the timer occurs are respectively determined. If automatic connection to a network is detected at step S21 in FIG. 20, the process proceeds to step S2 in FIG. 16, where OS environment setting is performed according to the network environment to which the notebook PC 100 is connected. If manual switching is detected at step S22 in FIG. 20, it is determined at step S24 whether the notebook PC 100 is still connected to the network. If it is not connected to the network, the process proceeds to step S2 in FIG. 16. If it is connected, the process proceeds to step S16 in FIG. 18, where the notebook PC 100 is monitored for being disconnected from the network. If a timeout is detected at step S23 in FIG. 20, the process returns to step S2 in FIG. 16.

In the environment setting program shown in FIGS. 16 through 20, the process from step S1 to step S13 represents the environment recognition section of the present invention, the process at step S14 represents one example of the environment recognition section of the present invention, and the process at step S15 represents one example of the application control section of the present invention.

What is claimed is:

1. An information processing device for performing processing including communication over a network, the information processing device being capable of connecting to a plurality of networks using a plurality of communicating sections, each communicating section corresponding to one of the plurality of networks and comprising:
   a memory storing information on search priorities for the plurality of networks;

an environment recognition section searching for a network environment to which the information processing device is connected in order of search priorities based on the information and detecting a unique address in a network environment to which the information processing device is connected and recognizing the network environment;

an environment setting section setting, in the information processing device, operating environment information appropriate to the network environment recognized by the environment recognition section, to enable the information processing device to communicate using one of the plurality of communicating sections, the one of the plurality of communicating section being used to recognize the network environment recognized by the environment recognition section, the operating environment information being a network information of an operating system for using a network corresponding to the network environment of the one of the plurality of communicating sections; and a table containing unique addresses corresponding to different networks, each unique address in the table being associated with operating environment information that may be set in the information processing device, wherein the environment recognition section searches the table for one unique address that matches the unique address on the connected network environment to identify the network environment.

2. The information processing device according to claim 1, wherein the environment setting section sets operating environment information appropriate to the recognized network environment for the operating system.

3. The information processing device according to claim 2, comprising a table containing operating environment information for the operating system, the operating environment information being associated with a network environment, wherein the environment setting section refers to the table to obtain operating environment information for the operating system that is appropriate to the network environment recognized by the environment recognition section and sets the operating environment information.

4. The information processing device according to claim 1, wherein the unique address is a MAC address.

5. The information processing device according to claim 1, performing processing including communication over a LAN, wherein the environment recognition section obtains a unique address on a LAN to which the information processing device is connected to recognize a network environment to which the information processing device is connected.

6. The information processing device according to claim 1, performing processing including communication over a network conforming to the Bluetooth protocol, wherein the environment recognition section obtains a Bluetooth address formed by the identification number of a Bluetooth device to which the information processing device is connected to recognize a network environment to which the information processing device is connected.

7. The information processing device according to claim 1, wherein an application program is executed using the operating system on the information processing device, the information processing device further comprising an application control section changing an operating status of the application program according to the recognized network environment.

8. The information processing device according to claim 7, wherein the environment setting section sets operating environment information for the application program that is appropriate to the recognized network environment.

9. The information processing device according to claim 8, comprising a table containing operating environment information for the application program that is associated with a network environment, wherein the environment setting section refers to the table to obtain the operating environment information for the application program that is appropriate to the network environment recognized by the environment recognition section and sets the operating environment information.

10. The information processing device according to claim 7, comprising an application control table containing information about an application program that is associated with a network environment and is to be activated or deactivated, wherein the application control section refers to the application control table to activate or deactivate the application program according to the network environment recognized by the environment recognition section.

11. An environment setting program storage medium storing an environment setting program executed on an information processing device performing processing including communication over a network, the environment setting program causing the information processing apparatus to function as:

an information processing device capable of using a plurality of networks using a plurality of communicating sections, each communicating section corresponding to one of the plurality of networks;

an environment recognition section searching for a network environment to which the information processing device is connected in an order of search priorities for the plurality of networks stored in a memory, and detecting a unique address in a network environment to which the information processing device is connected and recognizing the network environment; and an environment setting section setting, in the information processing device, operating environment information appropriate to the network environment recognized by the environment recognition section to enable the information processing device to communicate using one of the plurality of communicating sections, the one of the plurality of communicating section using the network environment recognized by the environment recognition sections, the operating environment information being a network information of an operating system for using a network, and corresponding to the network environment of the one of the plurality of communicating sections; and wherein the environment recognition section uses a table containing a unique addresses corresponding to different networks, each unique address in the table being associated with operating environment information that may be set in the information processing device, to search the table for one unique address that matches the unique address on the connected network environment to identify the network environment.

12. The environment setting program storage medium according to claim 11, wherein the environment setting section sets operating environment information appropriate to the recognized network environment for the operating system.

13. The environment setting program storage medium according to claim 12, wherein the environment setting section refers to a table containing operating environment information for the operating system that is associated with a network environment to obtain operating environment information for the operating system that is appropriate to the network environment recognized by the environment recognition section and sets the operating environment information.

14. The environment setting program storage medium according to claim 11, wherein the unique address is a MAC address.

15. The environment setting program storage medium according to claim 11, wherein the information processing device performs processing including communication over a LAN,
the environment recognition section obtains a unique address on a LAN to which the information processing device is connected to recognize a network environment to which the information processing device is connected.

16. The environment setting program storage medium according to claim 11, wherein the information processing device performs processing including communication over a network conforming to the Bluetooth protocol,
the environment recognition section obtains a Bluetooth address formed by the identification number of a Bluetooth device to which the information processing device is connected to recognize a network environment to which the information processing device is connected.

17. The environment setting program storage medium according to claim 11, wherein an application program is executed using the operating system on the information processing device, the environment setting program causing the information processing device to function as an application control section that changes an operating status of the application program according to the recognized network environment.

18. The environment setting program storage medium according to claim 17, wherein the environment setting section sets operating environment information for the application program that is appropriate to the recognized network environment.

19. The environment setting program storage medium according to claim 18, wherein the environment setting section refers to a table containing operating environment information for the application program that is associated with a network environment to obtain the operating environment information for the application program that is appropriate to the network environment recognized by the environment recognition section and sets the operating environment information.

20. The environment setting program storage medium according to claim 17, wherein the application control section refers to an application control table containing information about an application program that is associated with a network environment and is to be activated or deactivated to activate or deactivate the application program according to the network environment recognized by the environment recognition section.

21. An environment setting device in an information processing device performing processing including communication over a network, the information processing device being capable of connecting to a plurality of networks using a plurality of communicating sections, each communicating section corresponding to one of the plurality of networks, the environment setting device comprising:
an environment recognition section searching for a network environment to which the information processing device is connected in an order of priorities based on information on search priorities for the plurality of networks stored in a memory, and detecting a unique address in the network environment to which the information processing device is connected and recognizing the network environment;
an environment setting section setting, in the information processing device, operating environment information appropriate to the network environment recognized by the environment recognition section, to enable the information processing device to communicate using one of the plurality of communicating section, the one of the plurality of communicating section used to recognize the network environment recognized by the environment recognition section, the operating environment information being a network information of an operating system for using a network corresponding to the network environment using the one of the plurality of communicating sections; and
a table containing unique addresses corresponding to different networks, each unique address being associated with operating environment information that may be set in the information processing device,
wherein the environment recognition section searches the table for one unique address that matches the unique address on the connected network environment to identify the network environment.

22. The environment setting device according to claim 21, wherein the environment setting section sets operating environment information appropriate to the recognized network environment for the operating system.

23. The environment setting device according to claim 22, comprising a table containing operating environment information for the operating system, the operating environment information being associated with a network environment,
wherein the environment setting section refers to the table to obtain operating environment information for the operating system that is appropriate to the network environment recognized by the environment recognition section and sets the operating environment information.

24. The environment setting device according to claim 21, wherein the unique address is a MAC address.

25. The environment setting device according to claim 21, wherein the information processing device performs processing including communication over a LAN,
the environment recognition section obtains a unique address on a LAN to which the information processing device is connected to recognize a network environment to which the information processing device is connected.

26. The environment setting device according to claim 21, wherein, the information processing device performs processing including communication over a network conforming to the Bluetooth protocol,
the environment recognition section obtains a Bluetooth address formed by the identification number of a Bluetooth device to which the information processing device is connected to recognize a network environment to which the information processing device is connected.

27. The environment setting device according to claim 21, wherein an application program is executed using the operating system on the information processing device, the information processing device comprises an application control section changing an operating status of the application program according to the recognized network environment.

28. The environment setting device according to claim 27, wherein the environment setting section sets operating environment information for the application program that is appropriate to the recognized network environment.

29. The environment setting device according to claim 28, comprising a table containing operating environment information for the application program the operating environment information being associated with a network environment, wherein the environment setting section refers to the table to obtain the operating environment information for the application program that is appropriate to the network environment recognized by the environment recognition section and sets the operating environment information.

30. The environment setting device according to claim 27, comprising an application control table containing information about an application program that is associated with a network environment and is to be activated or deactivated, wherein the application control section refers to the application control table to activate or deactivate the application program according to the network environment recognized by the environment recognition section.

31. A method of setting an environment in an information processing device performing processing including communication over a network, the information processing device being capable of connecting to a plurality of networks using a plurality of communicating sections, each communicating section corresponding to one of the plurality of networks, the method comprising:

recognizing an environment by searching for a network environment to which the information processing device is connected in an order of search priorities based on information, the information containing search priorities for the plurality of networks an being stored in a memory, and detecting a unique address in the network environment to which the information processing device is connected to recognize the network environment; and setting an environment by setting operating environment information in the information processing device, the operating environment information being appropriate to the network environment recognized in the step of recognizing an environment to enable the information processing device to communicating using one of the plurality of communicating sections, the one of the plurality of communicating section being used to recognize the network environment recognized by the environment recognition sections, the operating environment information being a network information of an operating system for using a network corresponding to the network environment using the one of the plurality of communicating sections.

32. The method of claim 31, wherein the step of setting an environment comprises the step of setting operating environment information appropriate to the recognized network environment for the operating system.

33. The method of claim 32, wherein the step of setting an environment comprises the step of referring to a table to obtain operating environment information for the operating system that is appropriate to the network environment recognized in the step of recognizing an environment and setting the operating environment information, wherein the table contains operating environment information for the operating system, the operating environment information is associated with a network environment.

34. The method of claim 31, wherein the unique address is a MAC address.

35. The method of claim 31, wherein the information processing device performs processing including communication over a LAN, and wherein the step of recognizing an environment comprises the step of obtaining a unique address on a LAN to which the information processing device is connected to recognize a network environment to which the information processing device is connected.

36. The method of claim 31, wherein the information processing device performs processing including communication over a network conforming to the Bluetooth protocol, and wherein the step of recognizing an environment comprises the step of obtaining a Bluetooth address formed by the identification number of a Bluetooth device to which the information processing device is connected to recognize a network environment to which the information processing device is connected.

37. The method of claim 31, wherein an application program is executed using the operating system on the information processing device, the method further comprising controlling an application program by changing an operating status of the application program according to the recognized network environment.

38. The method of claim 37, wherein the step of setting an environment comprises the step of setting operating environment information for the application program that is appropriate to the recognized network environment.

39. The method of claim 38, wherein the step of setting an environment comprises the step of referring to a table to obtain the operating environment information for the application program that is appropriate to the network environment recognized in the step of recognizing an environment, and setting the operating environment information, and wherein the table contains operating environment information for the application program, the operating environment information being associated with a network environment.

40. The method of claim 37, wherein the step of controlling an application program comprises the step of referring to an application control table to activate or deactivate the application program according to the network environment recognized by the environment recognition section, and wherein the application control table contains information about an application program that is associated with a network environment and is to be activated or deactivated.

* * * * *

UNITED STATES PATENT AND TRADEMARK OFFICE
CERTIFICATE OF CORRECTION

| | |
|---|---|
| PATENT NO. | : 7,716,301 B2 |
| APPLICATION NO. | : 10/355282 |
| DATED | : May 11, 2010 |
| INVENTOR(S) | : Yoshizawa et al. |

It is certified that error appears in the above-identified patent and that said Letters Patent is hereby corrected as shown below:

In the Claims:

In Claim 31, Col. 17, line 30, change "an being stored" to -- and being stored --.

Signed and Sealed this
Fourteenth Day of May, 2013

Teresa Stanek Rea
*Acting Director of the United States Patent and Trademark Office*